United States Patent
Yang et al.

(10) Patent No.: US 9,209,499 B2
(45) Date of Patent: Dec. 8, 2015

(54) BATTERY PACK

(71) Applicants: SAMSUNG SDI CO., LTD., Yongin-si, Gyeonggi-do (KR); ROBERT BOSCH GMBH, Stuttgart (DE)

(72) Inventors: Seung-Woo Yang, Yongin-si (KR); In-Hwan Cha, Yongin-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 0 days.

(21) Appl. No.: 14/243,496

(22) Filed: Apr. 2, 2014

(65) Prior Publication Data

US 2014/0212713 A1    Jul. 31, 2014

Related U.S. Application Data

(63) Continuation of application No. 13/312,197, filed on Dec. 6, 2011, now Pat. No. 8,722,223.

(60) Provisional application No. 61/530,144, filed on Sep. 1, 2011.

(51) Int. Cl.
  *H01M 2/00* (2006.01)
  *H01M 10/613* (2014.01)
  *H01M 2/10* (2006.01)
  *H01M 10/625* (2014.01)
  *H01M 10/6557* (2014.01)
  *H01M 10/647* (2014.01)
  (Continued)

(52) U.S. Cl.
  CPC ........ *H01M 10/5004* (2013.01); *H01M 2/1077* (2013.01); *H01M 10/5016* (2013.01); *H01M 10/5059* (2013.01); *H01M 10/613* (2015.04); *H01M 10/625* (2015.04); *H01M 10/647* (2015.04); *H01M 10/6556* (2015.04); *H01M 10/6557* (2015.04); *H01M 10/6566* (2015.04)

(58) Field of Classification Search
  CPC .......... H01M 10/5016; H01M 2/1077; H01M 10/482; H01M 2/206; H01M 2/8217
  USPC .................................................... 429/72, 156
  See application file for complete search history.

(56) References Cited

U.S. PATENT DOCUMENTS 7,560,190 B2    7/2009  Ahn et al.
2001/0026886 A1  10/2001  Inui et al.
(Continued)

FOREIGN PATENT DOCUMENTS

DE   10 2009 053 506 A1   5/2011
EP   1 548 858 A2   6/2005
(Continued)

*Primary Examiner* — Cynthia H Kelly
*Assistant Examiner* — Monique Wills
(74) *Attorney, Agent, or Firm* — Lee & Morse, P.C.

(57) ABSTRACT

A battery pack includes a plurality of battery modules including at least a first group of the battery modules and a second group of the battery modules, a first coolant flow pathway through the battery modules of the first group and the second group, a second coolant flow pathway along an exterior of the battery modules of the first group, and a converging coolant flow pathway connected with the first coolant flow pathway, the converging coolant flow pathway being disposed downstream of the first group of the battery modules, the converging coolant flow pathway joining the second coolant flow pathway with the first coolant flow pathway.

9 Claims, 5 Drawing Sheets

(51) Int. Cl.
*H01M 10/6556* (2014.01)
*H01M 10/6566* (2014.01)

(56) References Cited

U.S. PATENT DOCUMENTS

| | | |
|---|---|---|
| 2007/0031728 A1 | 2/2007 | Lee et al. |
| 2007/0072061 A1* | 3/2007 | Shimizu .......................... 429/62 |
| 2008/0124620 A1 | 5/2008 | Shimoyama |
| 2011/0212352 A1 | 9/2011 | Wood et al. |

FOREIGN PATENT DOCUMENTS

| | | |
|---|---|---|
| EP | 2 502 292 A1 | 9/2012 |
| JP | 2004-014520 | 1/2004 |
| KR | 10 2006-0036694 A | 5/2006 |
| KR | 10-2007-0014661 A | 2/2007 |
| WO | WO 01/22522 A1 | 3/2001 |
| WO | WO 2007/007503 A1 | 1/2007 |
| WO | WO 2007/114615 A1 | 10/2007 |
| WO | WO 2011/057815 | 5/2011 |

* cited by examiner

BATTERY PACK

CROSS-REFERENCE TO RELATED APPLICATIONS

This is a continuation application based on pending application Ser. No. 13/312,197, filed Dec. 6, 2011, the entire contents of which is hereby incorporated by reference. application Ser. No. 13/312,197 claims priority under 35 U.S.C. §119(e) to U.S. Provisional Application No. 61/530,144, filed on Sep. 1, 2011, and entitled: "Battery Pack," which is incorporated herein by reference in its entirety.

BACKGROUND

1. Field

The present invention relates to a battery pack.

2. Description of the Related Art

Generally, a battery cell is used as an energy source for a mobile device, an electric car, a hybrid car, or the like and is used by variously changing a form of the battery cell according to a kind of external devices.

When an electric car, a hybrid car, or the like, consuming a large amount of power needs long-time driving and high-power driving, a large-capacity battery module is configured by electrically connecting a plurality of battery cells so as to increase output and capacity. The battery module may increase output voltage or output current according to the number of batter cells embedded therein. Further, a battery pack may be configured by electrically connecting the plurality of battery modules to each other.

SUMMARY

According to an exemplary embodiment, there is provided a battery pack including a plurality of battery modules including at least a first group of the battery modules and a second group of the battery modules, a first coolant flow pathway through the battery modules of the first group and the second group, a second coolant flow pathway along an exterior of the battery modules of the first group, and a converging coolant flow pathway connected with the first coolant flow pathway, the converging coolant flow pathway being disposed downstream of the first group of the battery modules, the converging coolant flow pathway joining the second coolant flow pathway with the first coolant flow pathway.

The battery pack may further include a housing surrounding the plurality of battery modules, the housing including an inlet and an outlet for a coolant medium, wherein the battery modules are arranged in the housing such that the first group of the battery modules is closest to the inlet and the second group of the battery modules is closest to the outlet.

The inlet may include a main inlet connected to the first coolant flow pathway and a by-pass inlet connected to the second coolant flow pathway.

The battery modules may be arranged in a first direction between the inlet and the outlet of the housing.

The battery modules may each include a plurality of battery cells that are stacked and spaced apart in a second direction, perpendicular to and crosswise to the first direction, and end plates that are disposed at opposite ends of the battery cells in the second direction.

The second coolant flow pathway may be located between the end plates of the battery modules of the first group and an interior surface of the housing.

The plurality of battery modules may be spaced apart from each other in the first direction.

One or more sealing members may be provided between battery modules of the first group to seal the first coolant flow pathway and the second coolant flow pathway from each other and between battery modules of the second group to seal the first coolant flow pathway from an exterior of the battery modules of the second group.

The converging coolant flow pathway may include one or more guide members between a battery module of the second group that is closest to the first group of the battery modules and the interior surface of the housing to guide the converging coolant flow pathway to join the second coolant flow pathway with the first coolant flow pathway.

The battery modules of the first and second groups may be spaced apart from each other in the first direction by one predetermined distance. The first group of the battery modules may be spaced apart from the second group of the battery modules in the first direction by another predetermined distance. The other predetermined distance may be greater than the one predetermined distance.

The plurality of battery modules may further include a third group of the battery modules between the first group and the second group and arranged with the first group and the second group. The first coolant flow pathway may additionally pass through the battery modules of the third group. The second coolant flow pathway may additionally extend between the end plates of the battery modules of the third group and the interior surface of the housing. The converging coolant flow pathway may include a first converging coolant flow pathway joining the second coolant flow pathway with the first coolant flow pathway between the first group of the battery modules and the third group of the battery modules, and a second converging coolant flow pathway joining the second coolant flow pathway with the first coolant flow pathway between the third group of the battery modules and the second group of the battery modules.

The battery modules of the first, second and third groups may be spaced apart from each other in the first direction by one predetermined distance. The groups of battery modules are spaced apart from each other in the first direction by other predetermined distance. The other distances may be greater than the one predetermined distance.

One or more sealing members may be provided between the battery modules of the first group and between the battery modules of the third group to seal the first coolant flow pathway from the second coolant flow pathway, and between the battery modules of the second group to seal the first coolant flow pathway from an exterior of the battery modules of the second group.

The converging coolant flow pathway may include a step part between the first group of the battery modules and the third group of the battery modules, such that a distance between the end plates of the battery modules of the third group and the interior surface of the housing is less than a distance between end plates of the battery modules of the first group and the interior surface of the housing.

The step part may guide the first converging coolant flow pathway to join the second coolant flow pathway with the first coolant flow pathway.

The converging coolant flow pathway may further include one or more guide members between a battery module of the second group that is closest to the third group of the battery modules and the interior surface of the housing to guide the second converging coolant flow pathway to join the second coolant flow pathway with the first coolant flow pathway.

The converging coolant flow pathway may further include one or more first guide members that partially restrict the second coolant flow pathway between the end plates of the battery modules of the third group and the interior surface of the housing to guide the first converging coolant flow pathway to join the second coolant flow pathway with the first coolant flow pathway, and one or more second guide members between battery modules of the second group that is closest to the first group of the battery modules and the interior surface of the housing to guide the second converging coolant flow pathway to join the second coolant flow pathway with the first coolant flow pathway.

According to an embodiment, there is provided a battery pack including a plurality of battery modules, including at least a first group of the battery modules and a second group of the battery modules, an inlet in communication with an interior and exterior of the battery modules, and an outlet, wherein the battery modules, are arranged such that the first group of the battery modules is closest to the inlet, and the second group of the battery modules is closest to the outlet, and one or more guide members between the first group and the second group of the battery modules.

The inlet may include a main inlet in communication with the interior of the battery modules and a by-pass inlet in communication with the exterior of the battery modules of the first group.

The battery modules may be disposed within a housing, and the one or more guide members may extend from an interior of the housing toward the battery modules.

BRIEF DESCRIPTION OF THE DRAWINGS

The above and other features will become more apparent to those of ordinary skill in the art by describing in detail exemplary embodiments with reference to the attached drawings, in which.

DETAILED DESCRIPTION

Figure 1:
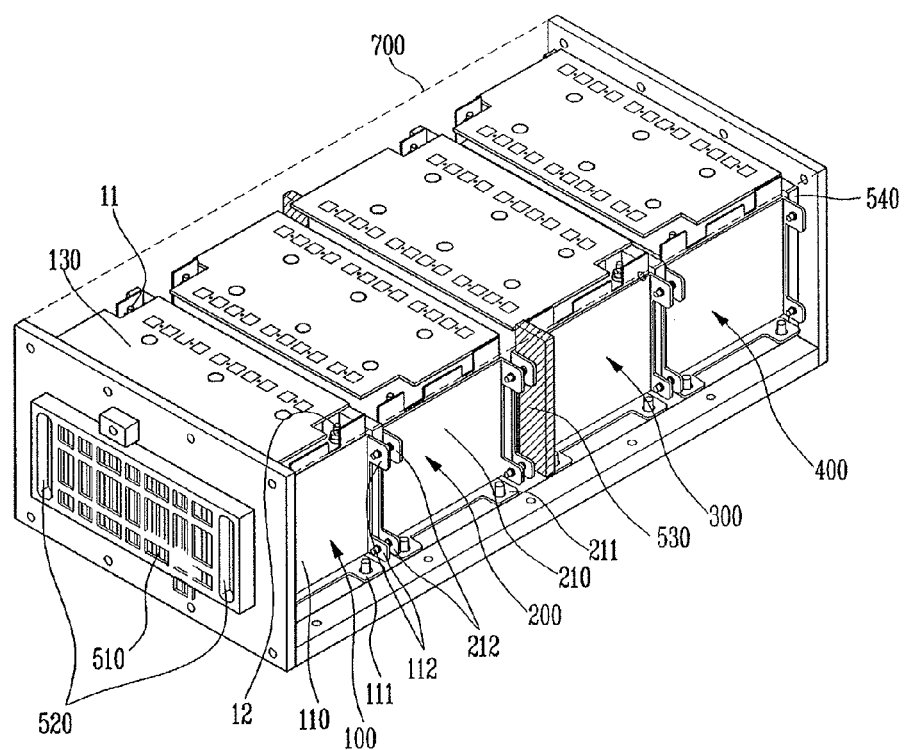
FIG. 1 illustrates a perspective view showing a battery pack according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope to those skilled in the art.

In the drawing figures, the dimensions of layers and regions may be exaggerated for clarity of illustration. Like reference numerals refer to like elements throughout.

Figure 2:
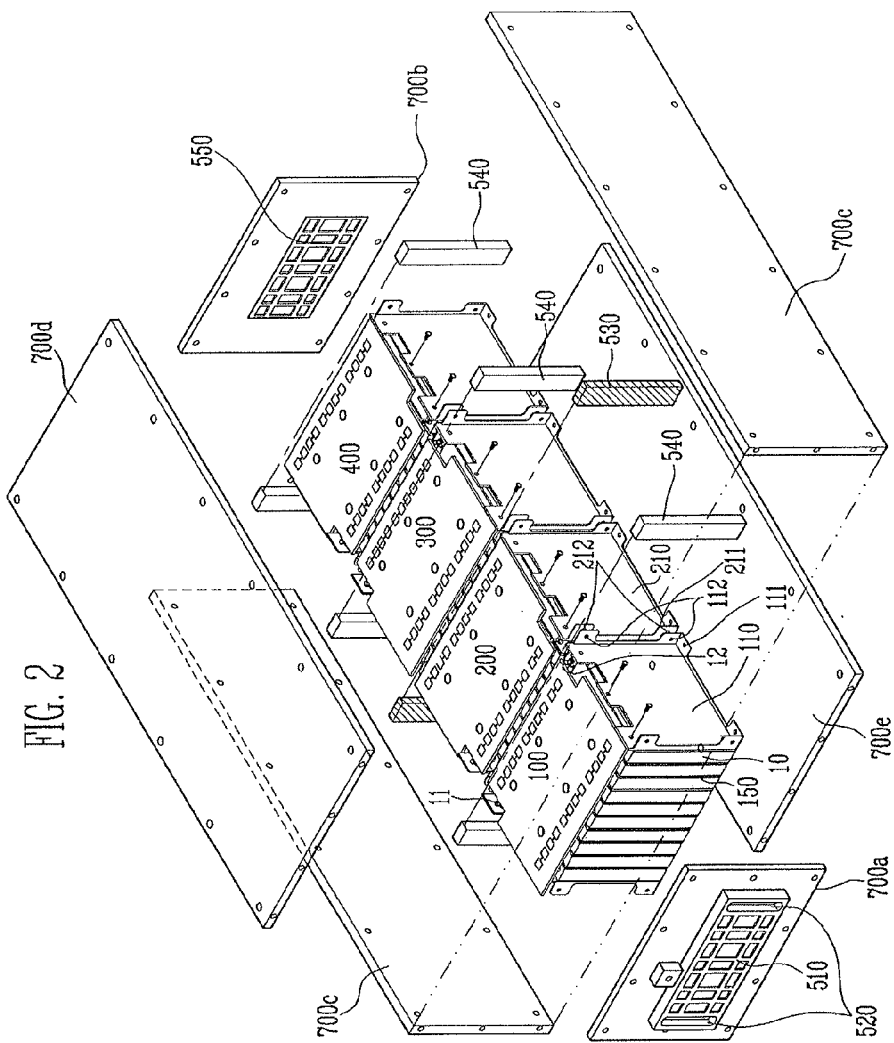
FIG. 2 illustrates an exploded perspective view showing the battery pack according to the exemplary embodiment of FIG. 1.
Figure 3:
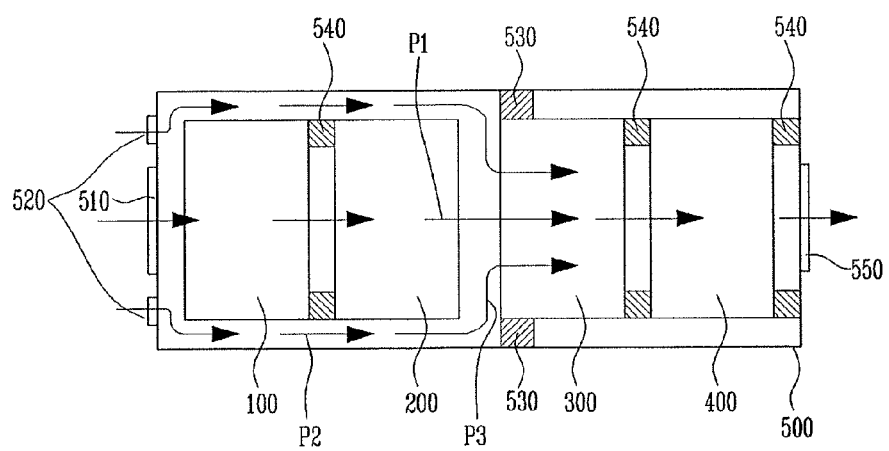
FIG. 3 illustrates a diagram showing a flow of a coolant of the battery pack according to the exemplary embodiment of FIG. 1.

FIG. 1 is a perspective view showing a battery pack according to an exemplary embodiment and FIG. 2 is an exploded perspective view showing the battery pack according to the exemplary embodiment. FIG. 3 is a diagram showing a flow of a coolant of the battery pack according to the exemplary embodiment of FIG. 1.

Referring to FIGS. 1 and 2, the battery pack according to this exemplary embodiment may include battery modules 100, 200, 300, and 400 arranged in a first direction.

The first battery module 100 may include a plurality of battery cells 10 arranged in a second direction, which may be perpendicular or orthogonal to the first direction, end plates 110 disposed at both ends of the plurality of battery cells 10, and a top cover 130 disposed on a top portion thereof. The first battery module 100 configured as described above and the second battery module 200 adjacent thereto may be disposed at a predetermined interval so that sides of the battery cells 10 of the first and second battery modules 100, 200 face each other. The third and fourth battery modules 300 and 400 adjacent to the second battery module 200 may be disposed so that sides of the battery cells 10 of the third and fourth battery modules 100, 200 face each other. Referring to FIG. 3, the battery modules 100, 200, 300, 400 may be referred to as at least a first group of the battery modules 100, 200 and a second group of the battery modules 300, 400. Although four battery modules 100, 200, 300, 400 are shown, it is to be understood that the number of battery modules and the number of groups of battery modules may vary.

In a typical battery pack, a coolant supplied to an inlet of a housing in which battery modules are disposed may pass through the central portions of a plurality of battery modules and reduce the temperature of the battery modules that are closest to the inlet. However, the coolant passing through battery modules that are disposed far away from an inlet will have passed through and adsorbed heat from the battery modules closer to the inlet and the temperature of the coolant will have been increased in advance. Accordingly, it may be difficult to lower the temperature of the battery modules farther from the inlet.

As a result, in order to compensate for the temperature deviation between the battery modules close to the inlet and the battery modules farther from the inlet, the flux of the coolant may be increased to the battery modules farther from the inlet by operating a fan. However, the operation of the fan may degrade the lifespan of the fan and the battery pack.

The present embodiment may address a problem of unequal cooling of battery modules closer to the inlet and farther from the inlet, and a problem of degradation of a fan due to overuse, by providing a battery pack that includes first coolant flow pathway P1, a second coolant pathway P2, and a converging coolant flow pathway P3 with respect to battery modules.

The first coolant flow pathway P1 may be located through the battery modules of the first group 100, 200 and the second group 300, 400. The second coolant flow pathway P2 may be located along an exterior of the battery modules 100, 200 of the first group. The converging coolant flow pathway P3 may be disposed downstream of the first group 100, 200 of battery modules and may join the second coolant flow pathway P2 with the first coolant flow pathway P1. In this way, some portion of coolant may be supplied to the second group of the battery modules 300, 400 without passing through and being heated by the first group of the battery modules 100, 200.

A housing 700 may surround the battery modules 100, 200, 300, 400. The inside of the housing 700 may be provided with a guide member 530 and a sealing member 540. The housing 700 receiving the plurality of battery modules 100, 200, 300, and 400 may include a main inlet 510 and a bypass inlet 520 disposed on a surface 700a corresponding to one side of the first battery module 100. Further, in the housing 700, an opposite surface 700b facing the main inlet 510 and the bypass inlet 520, that is, a surface 700b corresponding to the other side of the fourth battery module 400 may be provided with an outlet 550. In this configuration, the main inlet 510 may supply a coolant to central portions of the plurality of battery modules 100, 200, 300, and 400 by the first coolant flow pathway P1, and the bypass inlet 520 may supply the coolant to both ends of the first and second battery modules 100 and 200 by the second coolant flow pathway P2, and thereafter, to the central portions of the third and fourth battery modules 300 and 400.

In more detail, the guide member 530 capable of controlling the flow of the coolant introduced into the bypass inlet 520 may be disposed within the housing 700. The guide member 530 may guide the coolant supplied to the bypass inlet 520 along both ends of the first and second battery modules 100 and 200 by the second coolant flow pathway P2 to enter the converging coolant flow pathway P3 to join the first coolant flow pathway P1 in the central portions of the third and fourth battery modules 300 and 400.

To this end, the guide member 530 may be disposed between both ends of the third battery module 300 and the inner surface of the housing 700. The guide member 530 may be disposed so as to close a space between both ends of the third battery module 300 and an inner surface of the housing 700.

Therefore, the coolant supplied to the bypass inlet 520 in the second coolant flow pathway P2 does not pass through the central portions of the first battery module 100 and the second battery module 200 but passes along both ends of the first battery module 100 and the second battery module 200. Then, the guide member 530 closes a space between the third battery module 300 and the inner surface of the housing 700 and thus, the flow of the coolant is diverted through the converging coolant flow pathway P3 to the central side of the third battery module 300. Thereby, a coolant of the relatively low temperature may be supplied to the central portions of the third battery module 300 and the fourth battery module 400, thereby reducing the temperature of the third battery module 300 and the fourth battery module 400 and avoiding the overuse and degradation of a fan.

The coolant supplied from the main inlet 510 to the first coolant flow pathway P1 and the coolant supplied from the bypass inlet 520 to the second coolant flow pathway P2 are not mixed while the coolant passes through the first battery module 100 and the second battery module 200. A sealing member 540 may be disposed between the first battery module 100 and the second battery module 200 at both ends of the battery modules. The sealing member 540 may be made of sponge, rubber, or the like. As a result, the coolant supplied to the main inlet 510 and passing through the central portions of the first battery module 100 and the second battery module 200 in the first coolant flow pathway P1 and the coolant supplied to the bypass inlet 520 and passing along both ends of the first battery module 100 and the second battery module 200 through the second coolant flow pathway P2 may be kept separated.

In addition, after the coolant supplied to the bypass inlet 520 is diverted to the central side of the third battery module 300 through the converging coolant flow pathway P3, the combined coolant may be prevented from being discharged to ends of the third battery module 300 and the fourth battery module 400. The sealing member 540 may be disposed between the third battery module 300 and the fourth battery module 400 at both ends of the battery modules and between the ends of the fourth battery module 400 and the side 700b of the housing 700 in which the outlet 550 is disposed.

Therefore, the temperature deviation between the first battery module 100 and the second battery module 200 disposed near the main inlet 510 and the bypass inlet 520 and the third battery module 300 and the fourth battery module 400 that are disposed far away from the main inlet 510 and the bypass inlet 520 may be reduced.

Hereinafter, the first battery module 100 as the battery module will be briefly described as an example.

The first battery module 100 may be formed by aligning the plurality of battery cells 10 in the second direction. The battery cell 10 may be manufactured by receiving the electrode assembly and the electrolyte in a case and then, sealing the case with the cap plate. The anode terminal 11 and the cathode terminal 12 and a vent disposed between the terminals 11 and 12 may be disposed on the cap plate. Further, the electrode assembly may be configured to have an anode plate and a cathode plate and a separator interposed between these plates. In this configuration, the anode plate may be connected to the anode terminal 11, and the cathode plate may be connected to the cathode terminal 12, thereby transferring energy generated by the electrochemical reaction of the electrode assembly and the electrolyte to the outside. In addition, the vent may serve to provide a passage that discharges gas generated from the inside of the battery cell 10 to the outside.

The battery cells 10 may be aligned so that the wide surfaces thereof face each other. Further, the anode terminal 11 and the cathode terminal 12 of the two adjacent battery cells 10 may be electrically connected to each other via a bus bar. The bus bar may be provided with a hole through which the anode terminal 11 and the cathode terminal 12 may penetrate and the bus bar connecting the terminals 11 and 12 penetrating through the holes may be fixed by a member such as a nut, or the like.

Further, both ends of the plurality of battery cells 10 may be provided with a pair of end plates 110, the top portions thereof may be provided with a top plate, and the bottom portions thereof may be provided with a bottom plate. Further, the top portion of the top plate may be further provided with the top cover 130.

The pair of end plates 110 may be each disposed so as to contact the end ones of the battery cells 10 at the outermost portion, thereby pressing the plurality of battery cells 10 toward an inner side. In this case, the plurality of battery cells 10 supported by the pair of end plates 110, the top plate, and the bottom plate may be connected in series so that the anode terminal 11 and the cathode terminal 12 are alternately aligned with each other. The battery cells 10 may be spaced apart from each other in the second direction such that the first coolant pathway P2 may pass between adjacent ones of the battery cells 10

Each battery module 100, 200, 300, and 400 configured as described above may be received in the housing 700 and may be connected to each of the adjacent battery modules 100, 200, 300, and 400 by a fastening member.

Side portions of each end plate 110 and 210 disposed at both ends of the first battery module 100 and the second battery module 200 may be vertically curved and the portions thereof may be each provided with side fastening parts 112 and 212. The side fastening part 112 of the first battery module 100 may be fastened with the side fastening part 212 of the second battery module 200 by a fastening member. In this case, each side fastening portion 112 and 212 may be disposed on the top portion and the bottom portion of the end plates 110 and 210 and a gap therebetween may form the second coolant flow pathway P2 through which the coolant supplied to the bypass inlet 520 moves along both ends of the first battery module 100 and the second battery module 200.

Further, the mutually fastened battery modules 100, 200, 300, and 400 as described above may be inserted into the housing 700. In this case, each battery module 100, 200, 300, and 400 may be fastened to a bottom surface 700e of the housing 700 by a fastening member. Describing the first battery module 100 and the second battery module 200 as an example, the bottom portions of each end plate 110 and 210 may be vertically curved and include bottom fastening parts 111 and 211 that are disposed so as to be horizontally disposed to the bottom surface 700e of the housing 700. Therefore, the bottom fastening parts 111 and 211 of each battery module 100, 200, 300, and 400 may be fastened to the housing 700 by the fastening member. In this case, the fastening member may include a bolt or a stud.

Referring to FIG. 3, one surface of the housing 700 may be provided with the main inlet 510 and the bypass inlet 520, the main inlet 510 supplying the coolant to the first coolant flow pathway P2, for example, to the central portion of the first battery module 100 and the bypass inlet 520 supplying the coolant to the second coolant flow pathway P2, for example, along both ends of the first battery module 100. When the coolant is supplied to the main inlet 510 and the bypass inlet 520, a portion of the coolant may pass through the central portion and a portion of the coolant may pass along both ends of the first battery module 100.

First, describing the flow of the coolant passing through the main inlet 510, the coolant may be discharged to the outlet 550 by passing through the first group 100 and the second group 200 of battery modules via the first coolant flow pathway P2. For example, the coolant may pass through central portions of the second, third, and fourth battery modules 200, 300, and 400 via the central portion of the first battery module 100.

Further, describing the flow of the coolant passing through the bypass inlet 520, the coolant may pass via the second coolant flow pathway P2 along an exterior of the battery modules 100, 200 of the first group. For example, the coolant may pass along ends of the second battery module 200 via both of the first battery module 100. Thereafter, the coolant passing through the bypass inlet 520 does not pass along an exterior of the battery modules of the second group. For example, the coolant does not pass along ends of the third battery module 300. Instead, the coolant is directed by the guide member 530 disposed downstream of the first group of the battery modules 100, 200, for example, between the third battery module 300 and the inner surface of the housing 700 through the converging coolant flow pathway P3. In the converging coolant flow pathway P3, the coolant may join the first coolant flow pathway P2. For example, the coolant may be introduced into the central portion of the third battery module 300 by the guide member 530. Then, the coolant may be discharged to the outlet 550 through the central portion of the fourth battery module 400 via the central portion of the third battery module 300.

The flow of the coolant may significantly improve the temperature difference and the pressure difference between each battery module 100, 200, 300, and 400. That is, in the related art since the bypass inlet 520 is not formed, the coolant supplied to a main inlet sequentially passes through the first, second, third, and fourth battery modules. In this case, the temperature of the coolant passing through the third battery module and the fourth battery module, which are disposed farther away from the main inlet, may be very high and as a result, the cooling efficiency may be degraded and the temperature deviation between the battery cells 10 may be large.

However, a battery pack according to this exemplary embodiment may be provided with the bypass inlet 520 and the second coolant flow pathway P2 and converging coolant flow pathway P3. Accordingly, the coolant supplied to the bypass inlet 520 separately from the coolant supplied to the main inlet 510 does not pass through the central portion of the first and second battery modules 100 and 200 having a high temperature. Thereby, the temperature deviation between each battery module 100, 200, 300, and 400 may be remarkably reduced by introducing the coolant having the low temperature into the third and fourth battery modules 300 and 400.

Figure 4:
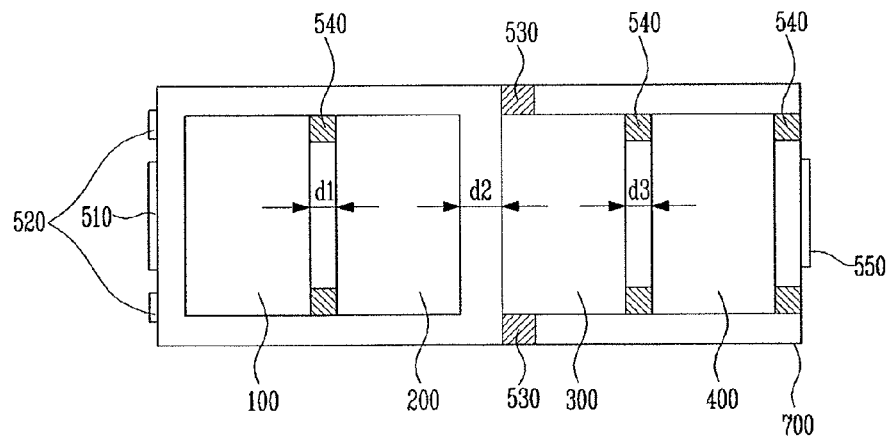
FIG. 4 illustrates a diagram showing an interval between battery modules in the battery pack according to the exemplary embodiment of FIG. 1.

FIG. 4 is a diagram showing an interval between battery modules in the battery pack according to this exemplary embodiment.

Referring to FIG. 4, an interval d2 between the battery module 200 and the third battery module 300 in which the guide member 530 is disposed, may be formed to be wider than an interval d1 between the first battery module 100 and the second battery module 200 in which the sealing member 540 is formed. In addition, the interval d2 between the second battery module 200 and the third battery module 300 may be formed to be wider than an interval d3 between the third battery module 300 and the fourth battery module 400.

In this configuration, as an example, the interval between the second battery module 200 and the third battery module 300 in which the guide member 530 is formed may be 15 mm to 25 mm, and the interval between the first battery module 100 and the second battery module 200 in which the sealing member 540 is formed and between the third battery module 300 and the fourth battery module 400 may be 5 mm to 10 mm.

Thereby, the coolant supplied to the bypass inlet 520 may pass along both ends of the first and second battery modules 100 and 200, such that the coolant may be smoothly introduced between the second module 200 and the third battery module 300. Thereafter, the coolant supplied from the bypass inlet 520 may join the coolant supplied from the main inlet 510 so as to be introduced into the central portion of the third battery module 300 together with the coolant passing through the central portion of the first battery module 100 and the second battery module 200.

Figure 5:
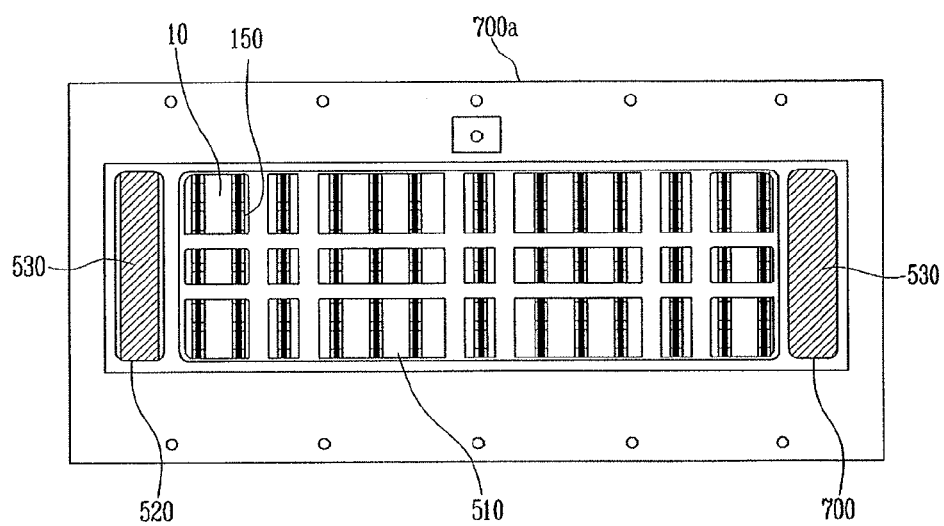
FIG. 5 illustrates a front view of the battery pack according to the exemplary embodiment of FIG. 1.

FIG. 5 is a front view of the battery pack according to this exemplary embodiment.

Referring to FIG. 5, the front surface of the battery pack may be provided with the main inlet 510 and the bypass inlet 520. The coolant supplied to the main inlet 510 may be supplied in the first coolant flow pathway P2 toward the central portion of the first battery module 100. In this case, a barrier 150 may be disposed between each battery cell 10. The barrier 150 forms a predetermined space between the battery cells 10 to provide a passage through which the coolant may pass.

Further, the coolant supplied from the bypass inlet 520 may be supplied toward both ends of the first battery module 100 in the second coolant flow pathway P2. In this case, both ends of the first and second battery modules 100 and 200 may be provided with a space between each side fastening parts 112 and 212 (see FIG. 2). Thereby, the coolant supplied to the bypass inlet 520 may smoothly pass along both ends of the first and second battery modules 100 and 200.

Table 1 shows the temperature difference between the battery cells for each flux of the coolant and the temperature deviation between the battery cell and the periphery thereof according to whether there is the bypass inlet 520 according to the exemplary embodiment.

TABLE 1

| | Division | | | |
|---|---|---|---|---|
| | Bypass Inlet(X) | | | Bypass Inlet (O) |
| Flux of Coolant | 1.5 A | 3 A | 4 A | 2 A |
| Temperature Difference Between Battery Cells to Targeted Value (° C.) | +3.2 | +1.3 | +0.4 | −0.6 |
| Temperature Difference between Battery Cell and Periphery Thereof With Respect To Targeted Value (° C.) | +4.2 | −0.3 | −1.8 | −1.9 |

As can be appreciated from Table 1, it is desirable to control the temperature difference between the battery cells disposed in other battery modules to a predetermined targeted value and the temperature between the battery cells. It is also desirable to control the periphery thereof to a predetermined targeted value or less. First, describing the case in which the bypass inlet is not formed ("Bypass Inlet (X)"), when the flux of the coolant is supplied at 1.5 A, the temperature difference between the battery cells is 3.2° C. higher than the targeted value. Further, the temperature difference between the battery cells and the periphery thereof is 4.2° C. higher than the targeted value, such that specifications desired in the battery pack are not satisfied.

In addition, when the bypass inlet is not formed, and the flux of the coolant is increased to 3 A and 4 A, respectively, the temperature difference between the battery cell and the periphery thereof is 0.3° C. or 1.8° C. lower than the targeted value, such that the specifications are satisfied. However, the temperature difference between the battery cells is 1.3° C. or 0.4° C. higher than the targeted value, such that the specifications are not satisfied.

Describing the case in which the bypass inlet according to the exemplary embodiment is mounted ("Bypass Inlet (O)"), when the flux of the coolant is supplied at 2 A, the temperature difference between the battery cells is 0.6° C. lower than the targeted value. Further, it can be appreciated that the temperature difference between the battery cells and the periphery thereof is 1.9° C. lower than the targeted value, such that the specifications required in the battery pack are satisfied.

That is, it can be appreciated that even though the coolant is supplied at a lower flux in the case in which the bypass inlet is formed than in the case in which the bypass inlet is not formed, the results satisfying the specifications desired in the battery pack are shown.

Figure 6:
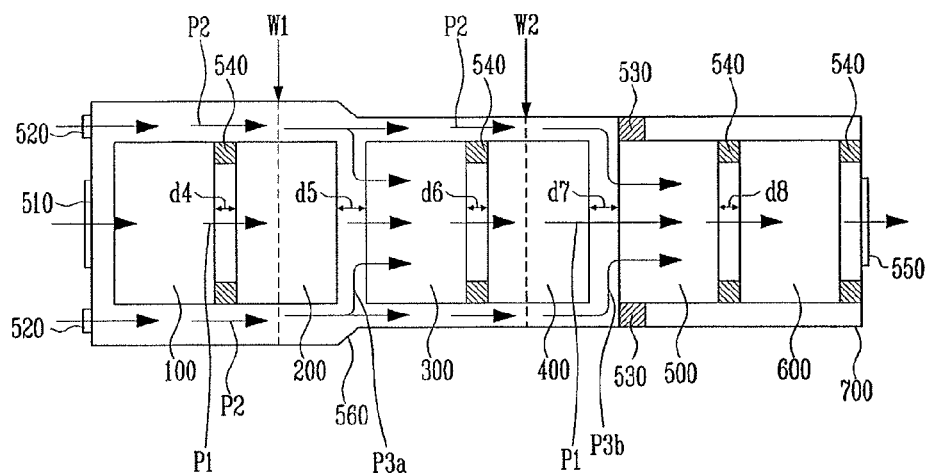
FIG. 6 illustrates a diagram showing a battery pack according to another exemplary embodiment.

FIG. 6 is a diagram showing a battery pack according to another exemplary embodiment.

Referring to FIG. 6, the plurality of battery modules may further include a third group 300, 400 of battery modules between the first group 100, 200 and the second group. For example, six battery modules 100, 200, 300, 400, 500, and 600 may be received in the housing 700. In this configuration, in order to compensate the temperature difference between each battery module 100, 200, 300, 400, 500, and 600, the first coolant flow pathway P2 may additionally pass through the battery modules of the third group 300, 400, and the second coolant flow pathway P2 may additionally extend between the end plates 110 of the battery modules of the third group 300, 400 and the interior surface of the housing 700. The converging coolant flow pathway P3 may include a first converging coolant flow pathway P3a joining the second coolant flow pathway P2 with the first coolant flow pathway P2 between the first group 100, 200 of battery modules and the third group 300, 400 of battery modules, and a second converging coolant flow pathway P3b joining the second coolant flow pathway P2 with the first coolant flow pathway P1 between the third group 300, 400 of battery modules and the second group 500, 600 of battery modules.

The housing 700 may be provided with a step part 560 and the guide member 530. The step part 560 and the guide member 530 may both serve to control the flow of the coolant supplied from the bypass inlet 520. In this case, the step part 560 may be disposed between the second battery module 200 and the third battery module 300 and the guide member 530 may be disposed between the fourth battery module 400 and the fifth battery module 500.

The step part 560 or the guide member 530 controlling the flow of the coolant having the low temperature supplied from the bypass inlet 520 may be each disposed between the battery modules 100, 200, 300, 400, 500, and 600 in two units. In this case, the preferred temperature difference between each battery module 100, 200, 300, 400, 500, and 600 may be about 4° C. to 5° C. In this case, in order to maintain the temperature difference of about 4° C. to 5° C. between each battery module 100, 200, 300, 400, 500, and 600 without operating the fan, it is desirable to control the flow of the coolant between the battery modules 100, 200, 300, 400, 500, and 600 in two units.

That is, even in a low flux of the coolant, in order to control the flow of the coolant so that the preferred temperature difference is provided between each battery module 100, 200, 300, 400, 500, and 600, it is desirable to form the step part 560 or the guide member 530 between the battery modules 100, 200, 300, 400, 500, and 600 in two units.

In the battery pack according to this exemplary embodiment, the step part 560 may be disposed in the housing 700 disposed between first group 100, 200 and the third group 300, 400, for example, between the second battery module 200 and the third battery module 300. Further, the guide member 530 may be disposed between the third group 300, 400 and the second group 500, 600, for example between both end plates 110 of the fifth battery module 500 and the inner surface of the housing 700.

The step part 560 may introduce the coolant that has been supplied to the bypass inlet 520 through the second coolant flow pathway P2, for example, along both ends of the first and second battery modules 100 and 200, into the first converging coolant flow pathway P3a between the first group 100, 200 and the third group 300, 400 of battery modules to join with the coolant in the first coolant flow pathway P2. For example, the step part 560 may direct the coolant from the second coolant flow pathway P2 into central portions of the third and fourth battery modules 300 and 400.

In this case, the step part 560 may be inclinedly formed so that the width of the housing 700 gradually becomes narrower. Thereby, a width W2 of the housing 700 downstream from the step part 560 may be formed to be narrower than a width W1 of the housing upstream from the step part 560. The step part 560 may be formed so as to narrow the second coolant flow pathway P2 between the exterior of the third battery module 300 and the housing 700. A portion of the coolant passing through the second coolant flow pathway P2 in the first group 100, 200 of the battery modules may continue through the second coolant flow pathway P2 in the third group 300, 400 of battery modules, and another portion of the coolant passing through the second coolant flow pathway P2 in the first group 100, 200 of the battery modules may enter the first converging coolant flow pathway P3a. For example, a portion of the coolant passing along an exterior of the first and second battery modules 100 and 200 may be introduced to the exterior of the third battery module 300 and the remaining coolant may be introduced into the central portion of the third battery module 300.

The portion of the coolant passing through the second coolant flow pathway P2 in the third group 300, 400 of battery modules then may pass through the second converging coolant flow pathway P3b between the third group 300, 400 of battery modules and the second group 500, 600 of battery modules to join the first coolant flow pathway P2 in the second group 500, 600 of battery modules. For example, the coolant passing along an exterior of the third battery module 300 may pass along both ends of the fourth battery module 400. The coolant may be introduced through the second converging coolant flow pathway P3b into the central portion of the fifth battery module 500 by the guide member 530 disposed between the exterior of the fifth battery module 500 and the inner surface of the housing 700. In this case, the guide member 530 may be disposed so as to seal between the exterior of the fifth battery module 500 and an inner surface of the housing 700.

Thereafter, the coolant introduced by way of the second coolant flow pathway P3b into the central portion of the fifth battery module 500 from both ends of the fourth battery module 400 joins the coolant supplied by way of the first coolant flow pathway P1 from the main inlet 510 or from the first coolant flow pathway P3a to pass through the central portion of the sixth battery module 600. The coolant may then be discharged to the outlet 550.

The coolant supplied from the main inlet 510 to the first coolant flow pathway P1 and from the bypass inlet 520 to the second coolant flow pathway P2 may be prevented from mixing, except where joined by the first and second converging coolant flow pathways P3a and P3b. To this end, the sealing member 540 may be further disposed between the first battery module 100 and the second battery module 200 at both ends of the battery modules 100, 200, between the third battery module 300 and the fourth battery module 400 at both ends of the battery modules 300, 400, between the fifth battery module 500 and the sixth battery module 600 at both ends of the battery modules 500, 600, and between the sixth battery module 600 and the inner surface of the housing 700 in which the outlet 550 is disposed.

The interval between adjacent ones of each battery module 100, 200, 300, 400, 500, and 600 may be formed to be different, in order to more smoothly move the coolant supplied from the bypass inlet 520 so as to be introduced into the central side of the third battery module 300 and the coolant passing through both ends of the fourth battery module 400 so as to be introduced into the central side of the fifth battery module 500.

That is, an interval d4 between the first battery module 100 and the second battery module 200, an interval d6 between the third battery module 300 and the fourth battery module 400, and an interval d8 between the fifth battery module 500 and the sixth battery module 600 may be formed to be the same. However, the interval d5 between the second battery module 200 and the third battery module 300 and the interval d7 between the fourth battery module 400 and the fifth battery module 500 may be formed to be larger than d4, d6, and d8.

Although not shown in this exemplary embodiment, the step part 560 may be formed so as to close between both ends of the specific battery module and the inner surface of the housing 700, such that the step part 560 may perform the same role as the guide member 530.

Figure 7:
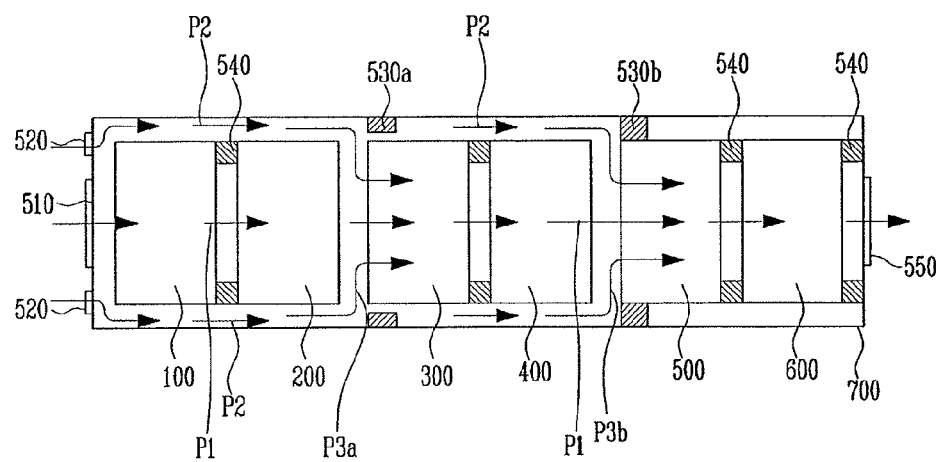
FIG. 7 illustrates a diagram showing a battery pack according to another exemplary embodiment.

FIG. 7 is a diagram showing a battery pack according to another exemplary embodiment.

Referring to FIG. 7, the six battery modules 100, 200, 300, 400, 500, and 600 may be received in the housing 700. In this configuration, in order to compensate for the temperature difference between each battery module 100, 200, 300, 400, 500, and 600, the housing 700 may be provided with a first guide member 530a and a second guide member 530b.

The first guide member 530a and the second guide member 530b both serve to control the flow of the coolant supplied from the bypass inlet 520 and in particular, to direct the flow of coolant from the second coolant flow pathway P2 to the first converging coolant flow pathway P3a or the second converging coolant flow pathway P3b. The first guide member 530a may be disposed between the first group of the battery modules 100, 200 and the third group of the battery modules 300, 400, for example, between the second battery module 200 and the third battery module 300. The second guide member 530b may be disposed between the third group of the battery modules 300, 400 and the second group of the battery modules 500, 600, for example, between the fourth battery module 400 and the fifth battery module 500.

The first guide member 530a is disposed between the third battery module 300 and the inner surface of the housing 700 at both ends of the third battery module and only partially blocks the second coolant flow pathway P2. Accordingly, a portion of the coolant that has been supplied from the bypass inlet 520 along both ends of the first and second battery modules 100 and 200 by way of the second coolant flow pathway P2 may be introduced into the central portion of the third battery module 300 by way of the first converging coolant flow pathway P3a. The remaining coolant may continue in the second coolant flow pathway P2 to be introduced into both ends of the third battery module 300. That is, the guide member 530a may be formed so as to partially close a portion between both ends of the third battery module 300 and the housing 700.

Further, the coolant passing along both ends of the fourth battery module 400 by way of the second coolant pathway P2 may be introduced by way of the second converging coolant pathway P3b into the central portion of the fifth battery module 500 by the second guide member 530b, which forms a barrier between both ends of the fifth battery module 500 and the inner surface of the housing 700. Then, the coolant passes through the central portion of the sixth battery module 600 and then, may be discharged to the outlet 550.

The coolant supplied from the main inlet 510 passes through the central portions of the first, second, third, fourth, fifth, and sixth battery modules 100, 200, 300, 400, 500, and 600 by way of the first coolant flow pathway P1 and then, may be discharged to the outlet 550.

The coolant supplied from the main inlet 510 and the bypass inlet 520 may be prevented from mixing, except where directed by the first converging coolant flow pathway P3a and the second converging coolant flow pathway P3b. To this end, the sealing member 540 may be further disposed at both ends between the first battery module 100 and the second battery module 200, at both ends between the third battery module 300 and the fourth battery module 400, at both ends between the fifth battery module 500 and the sixth battery module 600, and between the sixth battery module 600 and the inner surface of the housing 700 in which the outlet 550 is disposed.

As described above, the coolant supplied from the main inlet 510 may cool the first battery module 100 and the second battery module 200. Further, the coolant supplied from the bypass inlet 520 may be sequentially introduced into the central portions of the third, fourth, fifth, and sixth battery modules 300, 400, 500, and 600 without passing through the central portions of the first battery module 100 and the second battery module 200. Thereby, the coolant supplied from the bypass inlet 520 may cool the third, fourth, fifth, and sixth battery modules 300, 400, 500, and 600. In this case, the interval between each battery module 100, 200, 300, 400, 500, and 600 may be formed to be different.

By way of summation and review, a high-output, large-capacity battery pack may generate a large amount of heat during a charging and discharging process. Hence, it is desirable to have a battery pack that may easily discharge heat generated from each battery cell. Further, it is desirable that a temperature difference between installation positions of battery cells within the battery pack not be large.

When the heat discharge from the battery pack is not carried out well, a temperature deviation may occur between each battery cell, thereby degrading charging and discharging efficiency. Further, the temperature in the battery pack may rise due to heat generated from the battery cell; and as a result, the performance of the battery pack may be degraded. In the worse case, a risk of explosion may increase.

A battery pack according to embodiments disclosed herein may minimize a temperature difference and a pressure difference between the battery cells by bypassing a predetermined flux of a coolant to a side of an inlet side of a battery pack. The lifespan of the battery pack and of a fan that cools the battery pack may be improved by reducing the operation of the fan due to the improvement in the temperature difference and the pressure difference between the battery cells even with a small flux of a coolant.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A battery pack, comprising:
   a plurality of battery modules, including at least a first group of the battery modules and a second group of the battery modules;
   an inlet into the battery pack, the inlet being in communication with an interior of at least the first group of the battery modules and the second group of the battery modules and with an exterior of the first group of the battery modules, and
   an outlet from the battery pack, the outlet being in communication with the interior of at least the first group of the battery modules and the second group of the battery modules and with an exterior of the first group of the battery modules,
   wherein the first group and the second group of the battery modules are arranged with respect to each other in a first direction between the inlet and the outlet such that the first group of the battery modules is closest to the inlet, and the second group of the battery modules is closest to the outlet; and
   one or more guide members between the first group and the second group of the battery modules to guide a coolant flow path from the exterior of at least the first group of battery modules to a coolant flow path in the interior of the second group of battery modules.

2. The battery pack as claimed in claim 1, wherein the inlet includes a main inlet in communication with the interior of the battery modules and a by-pass inlet in communication with the exterior of the battery modules of the first group.

3. The battery pack as claimed in claim 1, wherein the battery modules are disposed within a housing, and the one or more guide members extend from an interior of the housing toward the battery modules.

4. The battery pack as claimed in claim 1, wherein:
   the battery modules within the first group and the second group are arranged in a second direction between the inlet and the outlet.

5. The battery pack as claimed in claim 1, further including a housing surrounding the plurality of battery modules, the housing including the inlet and the outlet for a coolant medium.

6. The battery pack as claimed in claim 5, wherein the inlet includes a main inlet connected to a first coolant flow pathway and a by-pass inlet connected to a second coolant flow pathway.

7. The battery pack as claimed in claim 6, wherein the one or more guide members are between a battery module of the second group that is closest to the first group of the battery modules and an interior surface of the housing to guide a converging coolant flow pathway to join the second coolant flow pathway with the first coolant flow pathway between the inlet and the outlet and upstream of the second group of battery modules.

8. The battery pack as claimed in claim 7, wherein:
   the plurality of battery modules further includes a third group of the battery modules between the first group and the second group and arranged with the first group and the second group,
   the first coolant flow pathway additionally passes through the battery modules of the third group,
   the second coolant flow pathway additionally extends between the battery modules of the third group and the interior surface of the housing, and
   the converging coolant flow pathway includes:
      a first converging coolant flow pathway joining the second coolant flow pathway with the first coolant flow pathway between the first group of the battery modules and the third group of the battery modules between the inlet and the outlet and upstream of the third group of battery modules, and
      a second converging coolant flow pathway joining the second coolant flow pathway with the first coolant flow pathway between the third group of the battery modules and the second group of the battery modules between the inlet and the outlet and upstream of the second group of battery modules.

9. The battery pack as claimed in claim 8, wherein the converging coolant flow pathway further includes:
   one or more first guide members that partially restrict the second coolant flow pathway between the battery modules of the third group and the interior surface of the housing to guide the first converging coolant flow pathway to join the second coolant flow pathway with the first coolant flow pathway, and
   one or more second guide members between battery modules of the second group that is closest to the first group of the battery modules and the interior surface of the housing to guide the second converging coolant flow pathway to join the second coolant flow pathway with the first coolant flow pathway.

* * * * *